United States Patent [19]
Fukumochi et al.

[11] Patent Number: 5,321,607
[45] Date of Patent: Jun. 14, 1994

[54] AUTOMATIC TRANSLATING MACHINE

[75] Inventors: Yoji Fukumochi; Tokuyuki Hirai, both of Nara, Japan

[73] Assignee: Sharp Kabushiki Kaisha, Osaka, Japan

[21] Appl. No.: 65,907

[22] Filed: May 25, 1993

[30] Foreign Application Priority Data

May 25, 1992 [JP] Japan .................. 4-132783

[51] Int. Cl.⁵ .......................................... G06F 15/38
[52] U.S. Cl. ...................................... 364/419.04
[58] Field of Search ............ 364/419.02, 419.04, 364/419.08

[56] References Cited

U.S. PATENT DOCUMENTS

| | | | |
|---|---|---|---|
| 4,599,691 | 7/1986 | Sakai et al. | 364/419.08 |
| 5,060,155 | 10/1991 | Van Zuijlen | 364/419.08 |
| 5,068,789 | 11/1991 | Van Vliemberger | 364/419.08 |
| 5,128,865 | 7/1992 | Sadler | 364/419.08 |
| 5,243,520 | 9/1993 | Jacobs et al. | 364/419.08 |

FOREIGN PATENT DOCUMENTS 63-136266 6/1988 Japan .
452868 2/1992 Japan .

Primary Examiner—Donald E. McElheny, Jr.

[57] ABSTRACT

An automatic translating machine includes a module for producing a plurality kinds of parsing trees possible for a sentence in a first language, a module for producing translated sentences in a second language based on the parsing trees, a device for designating an arbitrary word in the sentence in the first language, and a first selection device for selecting arbitrary one of a plurality of constituents of the sentence in the first language each including the word such as a verbal phrase and a noun phrase. A verbal phrase and a noun phrase can be analyzed into a plurality of subtrees due to ambiguity present in a sentence in the first language. The automatic translating machine further includes a device for selecting arbitrary one of a plurality kinds of constituents of a translated sentence in the second language (such as a verbal phrase and a noun phrase in the second language) produced based on each of the plurality of subtrees of the parsing tree corresponding to the selected constituent.

12 Claims, 12 Drawing Sheets

| | gave | the | cat | food |
|---|---|---|---|---|
| | VERB | ARTICLE | NOUN | NOUN |
| 1 | VERB | NOUN PHRASE | | |
| | VERBAL PHRASE ( the cat food is given ) | | | |
| 2 | VERB | NOUN PHRASE | | NOUN PHRASE |
| | VERBAL PHRASE ( the cat is given food ) | | | |

FIG. 7

| | put | the | block | in | the | box | on | the | table |
|---|---|---|---|---|---|---|---|---|---|
| 1 | VERB | ARTICLE | NOUN | PREP. | ARTICLE | NOUN | PREP. | ARTICLE | NOUN |
| | VERB | NOUN PHRASE | | PREP. | NOUN PHRASE | | PREP. | NOUN PHRASE | |
| | VERB | NOUN PHRASE | | | PREP. PHRASE | | | PREP. PHRASE | |
| | VERB | NOUN PHRASE | | | | | | | |
| | VERBAL PHRASE (the block in the box is put on the table) | | | | | | | | |
| 2 | VERB | NOUN PHRASE | | PREP. | NOUN PHRASE | | PREP. | NOUN PHRASE | |
| | VERB | NOUN PHRASE | | PREP. | NOUN PHRASE | | | PREP. PHRASE | |
| | VERB | NOUN PHRASE | | PREP. | NOUN PHRASE | | | | |
| | VERB | NOUN PHRASE | | | PREPOSITIONAL PHRASE | | | | |
| | VERBAL PHRASE (the block is put in the box on the table) | | | | | | | | |
| 3 | VERB | NOUN PHRASE | | PREP. | NOUN PHRASE | | PREP. | NOUN PHRASE | |
| | VERB | NOUN PHRASE | | PREP. | NOUN PHRASE | | | PREP. PHRASE | |
| | VERB | NOUN PHRASE | | PREP. | NOUN PHRASE | | | | |
| | VERB | NOUN PHRASE | | | PREPOSITIONAL PHRASE | | | | |
| | VERB | NOUN PHRASE | | | | | | | |
| | VERBAL PHRASE (the block in the box on the table is put) | | | | | | | | |

FIG. 12

| «ORIGINAL» | «TRANSLATION» |
|---|---|
| I gave the [cat] food, and put the block in the box on the table. | 私は、[キャット]フードを 与え、そして 箱の中の ブロックを テーブルの上に 置いた。 |

FIG. 13

| «ORIGINAL» | «TRANSLATION» |
|---|---|
| I [gave the cat food,] and put the block in the box on the table. | 私は、[キャットフードを 与え、] そして 箱の中の ブロックを テーブルの上に 置いた。 |

FIG. 14

| «ORIGINAL» | «TRANSLATION» |
|---|---|
| I [gave the cat food,] and put the block in the box on the table. | 私は、[猫に 食べ物を 与え、] そして 箱の中の ブロックを テーブルの上に 置いた。 |

FIG. 15

| «ORIGINAL» | «TRANSLATION» |
|---|---|
| I gave the cat food, and put the [block] in the box on the table. | 私は、猫に 食べ物を 与え、そして 箱の中の [ブロックを] テーブルの上に 置いた。 |

FIG. 16

| <<ORIGINAL>> | <<TRANSLATION>> |
|---|---|
| I gave the cat food, and put the block in the box on the table. | 私は、猫に 食べ物を 与え、そして 箱の中の ブロックを テーブルの上に 置いた。 |

FIG. 17

| <<ORIGINAL>> | <<TRANSLATION>> |
|---|---|
| I gave the cat food, and put the block in the box on the table. | 私は、猫に 食べ物を 与え、そして テーブルの上の 箱の中に ブロックを 置いた。 |

AUTOMATIC TRANSLATING MACHINE

BACKGROUND OF THE INVENTION

1. Field of the Invention

The present invention relates generally to automatic translating machines for translating a sentence in a source language into a sentence in a target language, and more specifically, to an automatic translating machine permitting a user to select the most appropriate translation of a sentence which can be translated in several ways.

2. Description of the Related Art

One example of a conventional automatic translating machine is disclosed in Japanese Patent Laying-Open No. 63-136266. As disclosed in this document, the conventional translating machine includes a morphological analysis portion for segmenting an input sentence into morphemes utilizing a dictionary thereby providing information such as part of speech, a syntactic analysis portion for analyzing the syntax of a morpheme string decomposed by the morphological analysis portion utilizing a dictionary and grammatical rules thereby providing a syntactic structure (parsing tree), a transformation portion for transforming the syntactic structure provided at the syntactic analysis portion into a syntactic structure in a target language, and a translated sentence producing portion for producing a translated sentence according to the syntactic structure in the target language provided by the transformation portion.

A disadvantage encountered in such a translating machine is that the input sentence can be interpreted in many ways because of ambiguity in the input sentence such that several translated sentences are produced. It is therefore necessary to select one of the obtained plurality of translated sentence that reflects the count meaning of the original sentence. Therefore in some cases translated sentences produced by the translated sentence producing portion are displayed on a picture frame one after another in response to an operator and then selection of a suitable translated sentence is left solely to the discretion of the operator. In other cases, the translated sentence producing portion produces several translated sentences according to the number of interpretations to display the resultant sentences on the picture frame at one time for permitting the operator to select the most suitable one from the group.

If, for example, the following English sentence is input as an input original sentence, roughly six translated sentences follows from the ambiguity of the original sentence itself. Of course the accuracy of translation in this case depends on the grammatical processing capability of a translating machine performing the translation and the level of dictionaries equipped to the machine. The following example is therefore only a general example.

TABLE 1

| [Original] | I gave the cat food, and put the block in the box on the table. |
|---|---|
| [Translation 1] | _____ , _____ |
| [Translation 2] | _____ , _____ |
| [Translation 3] | _____ , _____ |
| [Translation 4] | _____ , _____ |
| [Translation 5] | _____ , _____ |
| [Translation 6] | _____ , _____ |

The six different translations are provided for the following reason, In analysis of the syntax of the input sentence by the syntactic analysis portion, grammatical rules as shown in Table 2 are applied.

TABLE 2

| | |
|---|---|
| (a) | Sentence → declarative sentence   sentence end |
| (b) | declarative sentence → declarative sentence   comma   conjunction   declarative sentence |
| (c) | declarative sentence → noun phrase   verbal phrase |
| (d) | declarative sentence → verbal phrase |
| (e) | noun phrase → noun phrase   prepositional phase |
| (f) | noun phrase → noun |
| (g) | noun phrase → article   noun |
| (h) | noun phrase → article   noun   noun |
| (i) | prepositional phrase → preposition   noun phrase |
| (j) | verbal phrase → verb   noun phrase |
| (k) | verbal phrase → verb   noun phrase   prepositional phrase |
| (l) | verbal phrase → verb   noun phrase   noun phrase |

Referring to Table 2, rule (a), for example, indicates that "a sentence is formed of a declarative sentence and a sentence end", while rule (e) indicates that "a noun phrase is formed of a noun phrase and a prepositional phrase". Rules (e)–(h) each define a noun phrase, anything satisfying the right term of each rule is interpreted as a noun phrase. As indicated by rules (j) and (k), this applies to the case of a verbal phrase.

Since a plurality of grammatical rules can be applied to a noun phrase or a verbal phrase as described above, two interpretations are possible for the first underlined part of the Original Sentence, while three interpretations are possible for the second underlined part. As a result, 2×3=6 interpretations in total are generated for the Original Sentence.

Conventionally, these six translated sentences are displayed one after another, and a desired translated sentence displayed is selected or alternatively the operator selects one of the six translated sentences collectively displayed.

Suppose that the user intends to select translated sentence 5 from the above-described six translated sentences obtained. If the sentences are displayed in the order of translated sentences 1, 2, . . . the display would have to be switched at least four times until the desired translated sentence is displayed. If translated sentence 1 and translated sentence 5 are compared, the desired translation is already obtained for the first underlined part, and only the second underlined part should be translated differently. However, alternative translation candidates are displayed for the first underlined part as in translated sentences 2 and 4, and the work efficiency is not high in selection. If six kinds of interpretations exist as described above, all the translated sentences can be displayed by switching only five times. However, if the original sentence is complicated and long, a large number of interpretations will be obtained for the sentence, and therefore prolonging the time required for the selection operation.

In Laid-Open Japanese Patent No. 63-136266 described above, the sequentially displayed translated sentences are stored in a buffer. As a result, the translated system may be displayed in the reversed sequence by operating a special key, so that even if the operator skips an appropriate translated sentence, he/she can easily go back to the appropriate translated sentence. However, this method is not a fundamental solution to simplification of the selection process in the presence of a large number of possible translations as described above.

Similarly, the approach of displaying all the possible translations at one time on the picture frame has the following disadvantage. If an original sentence is complicated and long, the number of translated sentences obtained will be large as described above. Therefore, that large number of translated sentences cannot be displayed on one picture frame, and therefore it would be necessary to display them by switching. Furthermore, since the number of displayed translated sentences is large based on all the possibilities, it would be difficult to identify the appropriate translated sentence from the large number of sentences.

In order to solve such a disadvantage, a method is considered by which a user designates a prescribed range of an original sentence referring to the displayed translated sentences, and translation is performed based on different interpretations only within the designated range. Even if such a method is employed, however, the user cannot know which grammatical rule is applied to the original sentence nor how the sentence is segmented into phrases by the machine. Therefore, it is very much difficult for the user to accurately select a range in the original sentence in order to obtain a correct translation.

SUMMARY OF THE INVENTION

It is therefore an object of the invention to provide an automatic translating machine permitting a user to select an appropriate translated sentence if a plurality of interpretations are possible for an original sentence.

Another object of the invention is to provide an automatic translating machine permitting a user to easily select an appropriate translation of a part of an original sentence independently of other parts if a plurality of parts which can be interpreted in a plurality of ways are present in the original sentence.

Yet another object of the invention is to provide an automatic translating machine permitting a user to easily limit each part for selecting an appropriate translation thereof independently of other parts if a plurality of parts which can be interpreted in a plurality of ways are present in an original sentence.

A still further object of the invention is to provide an automatic translating machine permitting a user to easily and appropriately limit each part for selecting an appropriate translation independently of other parts if a plurality of parts which can be interpreted in a plurality of ways are present in an original sentence.

An automatic translating machine according to the invention includes an analysis module for producing a plurality of parsing trees possible for a sentence in a prescribed first language, a translation module for producing translated sentences in a prescribed second language based on the parsing trees in the first language, a manually operable designation device for designating an arbitrary first constituent (word, for example) in the sentence in the first language, and a manually operable first selection device for selecting an arbitrary one of a plurality of second constituents (verb phrase, noun phrase, etc.) each including a plurality of the first constituents. Each of the second constituents can be analyzed into a plurality of subtrees according to the analysis module due to ambiguity present in the sentence in the first language. The automatic translating machine further includes a manually operable second selection device for selecting an arbitrary one of a plurality of kinds constituents in the translated sentences in the second language (verb phrase, noun phrase, etc. in the second language) produced by the translation module based on the plurality kinds of subtrees corresponding to the selected second elements of the parsing tree.

In the above-described automatic translating machine, an arbitrary constituent in the sentence in the first language can be designated, and a range of translation can be designated utilizing a subtree having that constituent as a unit. The constituents of the sentence in the second language obtained by translating the sentence in the designated range can be selected independently of the other ranges. Since the number of cases of the combinations of parts which can be interpreted in a plurality of ways is reduced, ah appropriate translation can be readily obtained.

Of the subtrees including the designated constituent, only subtrees corresponding to the closed parts of the ambiguity of the input sentence are searched, and therefore a search of the subtrees can efficiently be conducted. The subtrees including the designated constituent are searched in a prescribed order, for example, an ascending order from the smallest one and the structure of the parsing tree can accurately be tracked, thus enabling efficient selection of an appropriate subtree.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a representation schematically showing information indicating structures corresponding to a plurality of interpretations permitted for the subtree B shown in FIG. 3;

FIG. 12 is a representation schematically showing a display when a word is designated;

FIG. 13 is a representation schematically showing a range corresponding to selected words in an original sentence and a range in the translation are displayed;

FIG. 14 is a representation schematically showing how the next candidate translation for the designated range is displayed;

FIG. 15 is a representation schematically showing the state of display when words of another part are designated;

FIG. 16 is a representation schematically showing how ranges corresponding to newly designated words in the original sentence and a translated sentence are displayed; and FIG. 17 is a representation schematically showing how the next candidate translation corresponding to the newly designated range is displayed.

DESCRIPTION OF THE PREFERRED EMBODIMENTS

Now, a translating machine which is one example of an automatic translating machine according to the invention will be described in detail in conjunction with the accompanying drawings.

Figure 1:
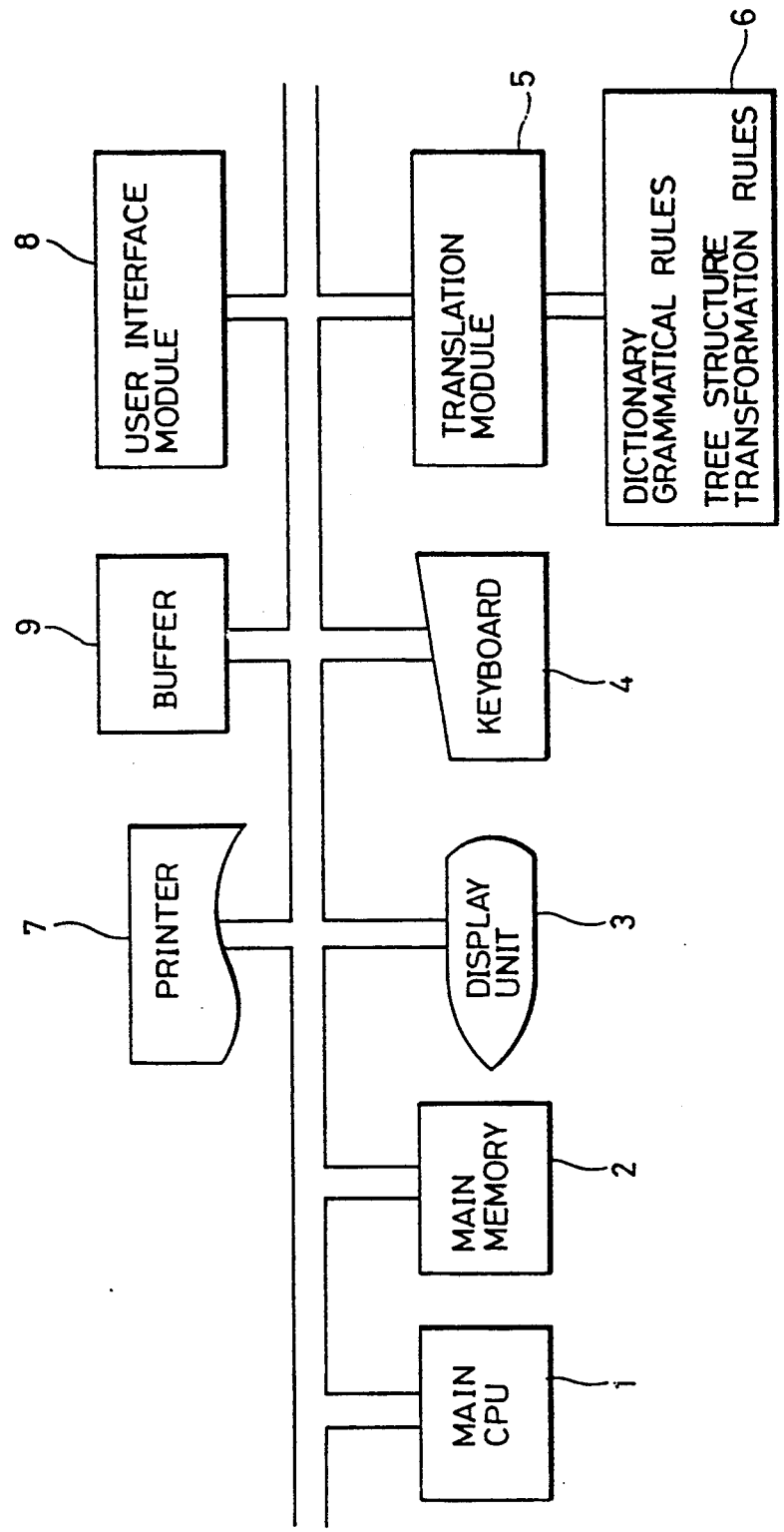
FIG. 1 is a block diagram showing a translating machine according to one embodiment of the invention.

Referring to FIG. 1, the translating machine as one example of an automatic translating machine according to the invention includes a main CPU (Central Processing Unit) 1, a main memory 2, a display unit (CRT(Cathode Ray tube)) (Cathode Ray Tube) 3, a keyboard 4, a translation module 5 for translating an input source language sentence into a target language sentence, a memory 6 storing a dictionary, grammatical rules and tree structure transformation rules used by translation module 5, a printer 7, a user interface module 8 for helping an operator to select an appropriate translated sentence from a plurality of translated sentences generated due to the ambiguity of the original sentence output by translation module 5, and a buffer 9 for storing information related to a parsing tree, etc. output by translating module 5.

Figure 2:
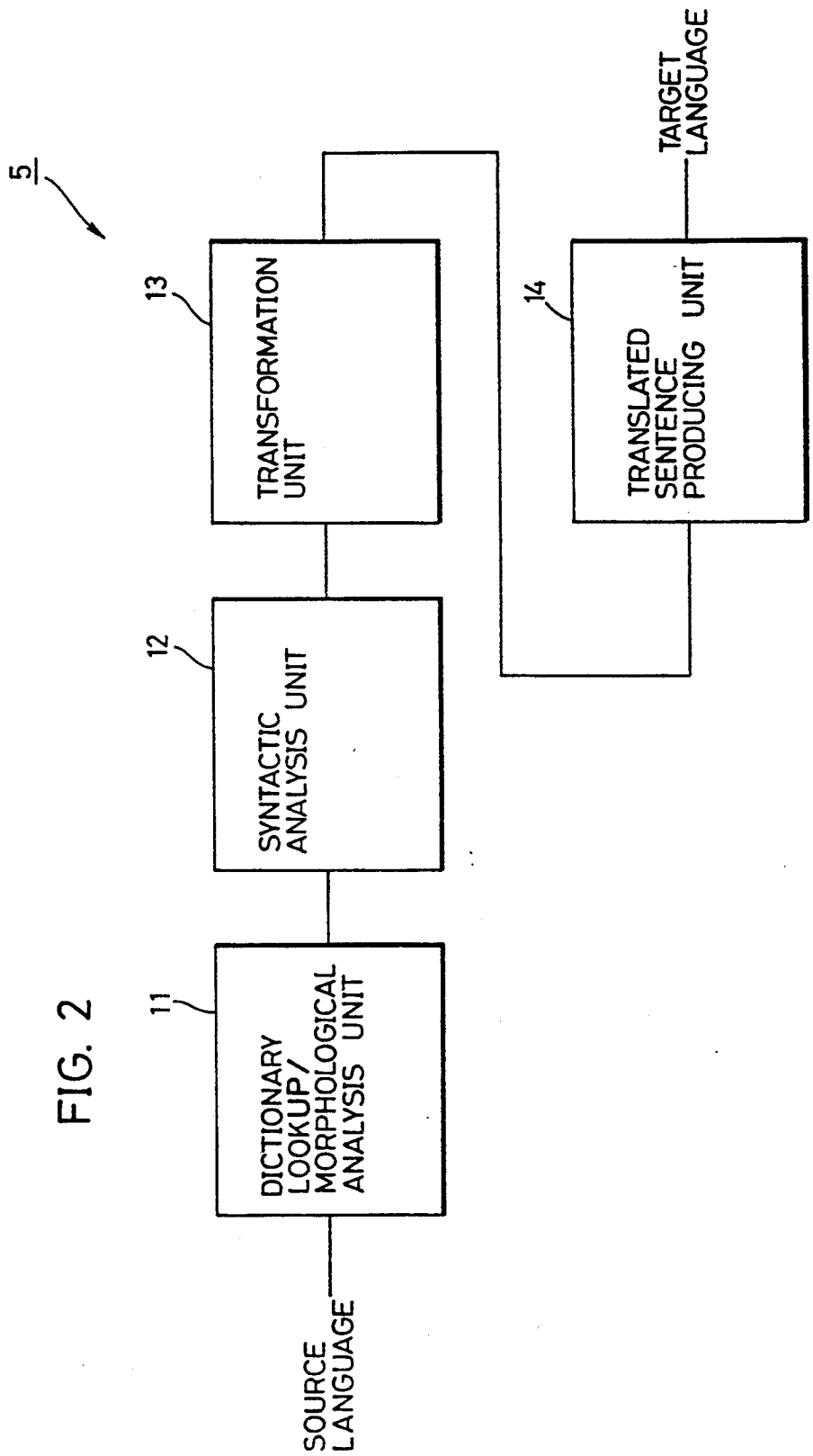
FIG. 2 is a functional block diagram showing a translation module.

Referring to FIG. 2, translation module 5 includes a dictionary lookup/morphological analysis unit 11, a syntactic analysis unit 12, a transformation unit 13, and a translated sentence producing unit 14. Dictionary lookup/morphological analysis unit 11 segments an input source language sentence into a morpheme string (word string) utilizing the dictionary stored in memory 6 in FIG. 1, provides grammatical information such as part of speech and translation for each word, and analyzes its tense/person/number. Syntactic analysis unit 12 decides a parsing tree representing qualifying/qualified relationship between the words. Transformation unit 13 transforms the parsing tree determined by syntactic analysis unit 12 into a parsing tree for a translated sentence according to the tree structure transformation rules stored in memory 6 in FIG. 1. Translated sentence producing unit 14 allocates a translation in a target language to each word of the transformed parsing tree. Translated sentence producing unit 14 further supplies the translated words arranged in an order according to the parsing tree with appropriate particle, auxiliary verb, etc. to produce a sentence in the target language.

It is assumed that the grammatical rules stored in memory 6 in FIG. 1 are those shown in Table 2.

As described above, a plurality of different parsing trees can be determined by syntactic analysis unit 12 from the order of application of the grammatical rules shown in Table 2 or the like. In the case of this embodiment, syntactic analysis unit 12 produces all possible constructions at one time, and stores them in buffer 9 as shown in FIG. 1. In this case, portions generating ambiguity are separated from portions not generating ambiguity, and a plurality of different constructions of possible interpretations are stored in parallel for those parts generating ambiguity. The detailed description thereof will be given later. Those parts generating ambiguity by themselves aside from surrounding portions will be referred to as "ambiguity closed parts". The ambiguity closed part belongs to the same category as the whole in a parsing tree (for example the same "verbal phrase"), but has a different structure inside (for example "verb +noun phrase" vs. "verb +noun phrase +noun phrase"). Hereinafter a group of words having one meaning in itself such as noun, noun phrase, verbal phrase, etc. will be referred to as a "constituent".

The translating machine shown in FIGS. 1 and 2 operates as follows. An input sentence in a source language is input into the translating machine from keyboard 4. The input sentence is sent to translation module 5 under the control of CPU 1. The operation of main CPU 1 is controlled based on a program stored in main memory 2.

Referring to FIG. 2, the input original sentence is subject to a morphological analysis by dictionary lookup/morphological analysis unit 11. More specifically, the read original sentence is segmented into each morpheme string (word string) utilizing the dictionary in memory 6. Grammatical information such as part of speech and translation for each word are provided, and tense/person/number, etc. are analyzed. The translating machine according to the embodiment translates a sentence from English to Japanese. Assuming input of the sentence "I gave the cat food, and put the block in the box on the table." The words of the input sentence are then segmented by dictionary lookup/morphological analysis unit 11, and as illustrated at the bottom in FIG. 3, information such as part of speech for each word is provided.

Syntactic analysis unit 12 decides a parsing tree indicating the qualifying/qualified relationship between words obtained by dictionary lookup/morphological analysis unit 11, utilizing the dictionary in memory 6 as described above and based on the grammatical rules shown in Table 1. Based upon, the determination, a plurality of interpretations may be partially be generated due to the ambiguity of the original sentence. Syntactic analysis unit 12 stores information indicating the parsing trees including the number of interpretation as such in buffer 9 in the following form.

Figure 3:
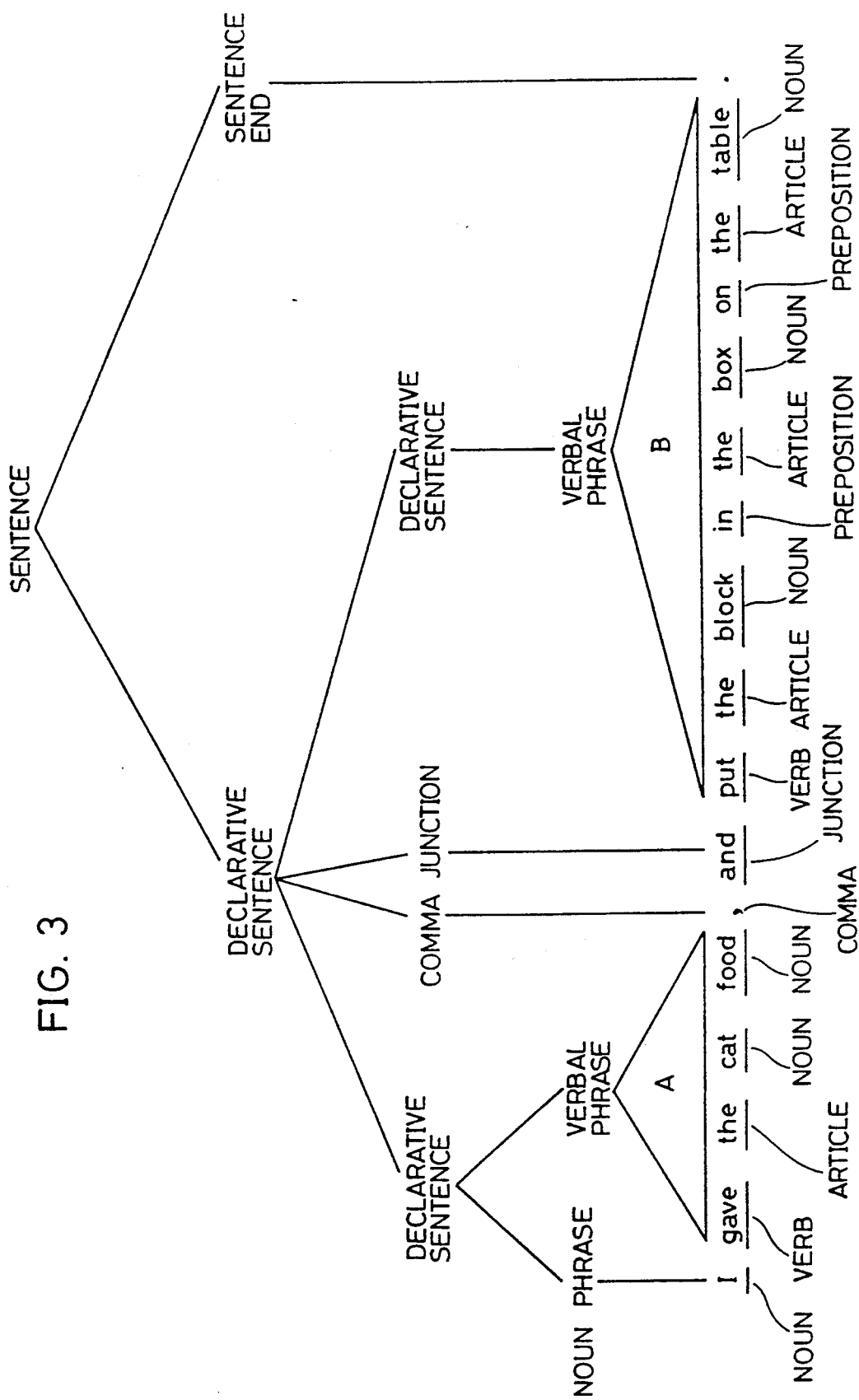
FIG. 3 is a representation schematically showing one example of a parsing tree.

Referring to FIG. 3, a parsing tree as illustrated in FIG. 3 is provided by applying the grammatical rules shown in Table 2 to the input English sentence. However, a plurality of interpretations are possible for the two subtrees A and B identified as "verbal phrase", due to the ambiguity of the respective parts. The subtrees A and B can each have a plurality of constructions corresponding to the differing interpretations. A portion defined by a subtree as these subtrees A and B constitutes one constituent.

Figures 4, 5:
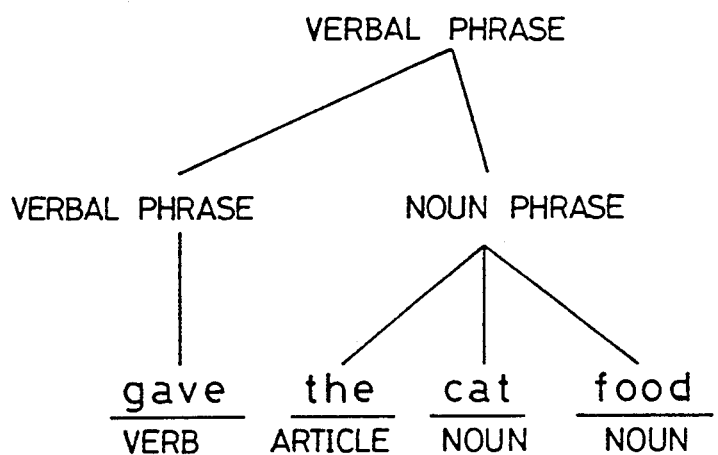
FIG. 4 is a representation schematically showing information indicating the structure of a subtree permitting a plurality of interpretations.
FIG. 5 is a representation schematically showing a subtree corresponding to the first verbal phrase shown in FIG. 4.
Figure 6:
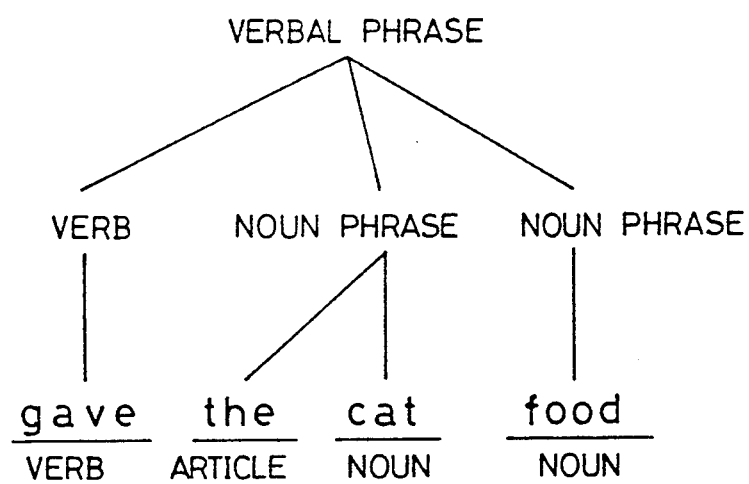
FIG. 6 is a representation schematically showing the structure of a subtree corresponding to the second verbal phrase shown in FIG. 4.
Figure 8:
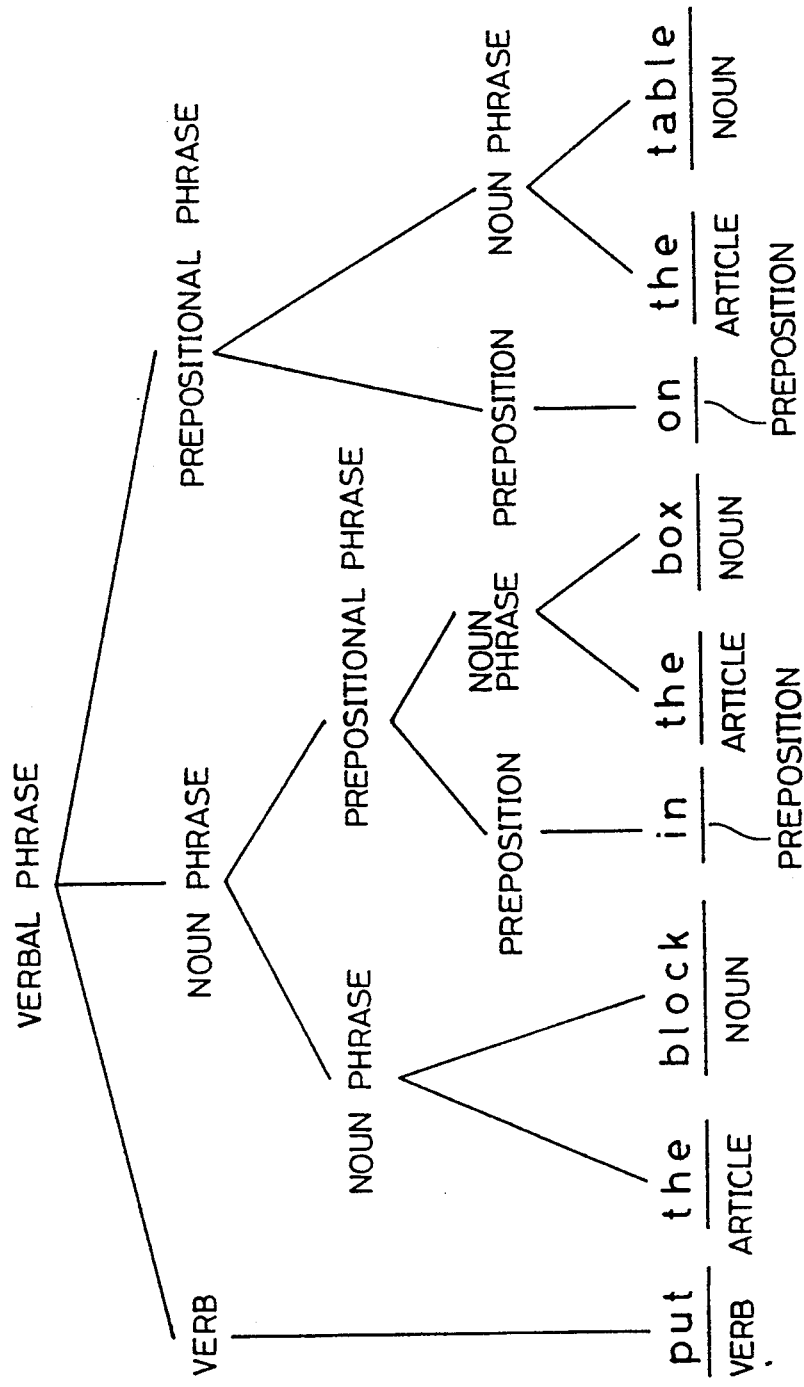
FIG. 8 is a representation schematically showing the structure of a subtree corresponding to a verbal phrase according to the first interpretation in FIG. 7.
Figure 9:
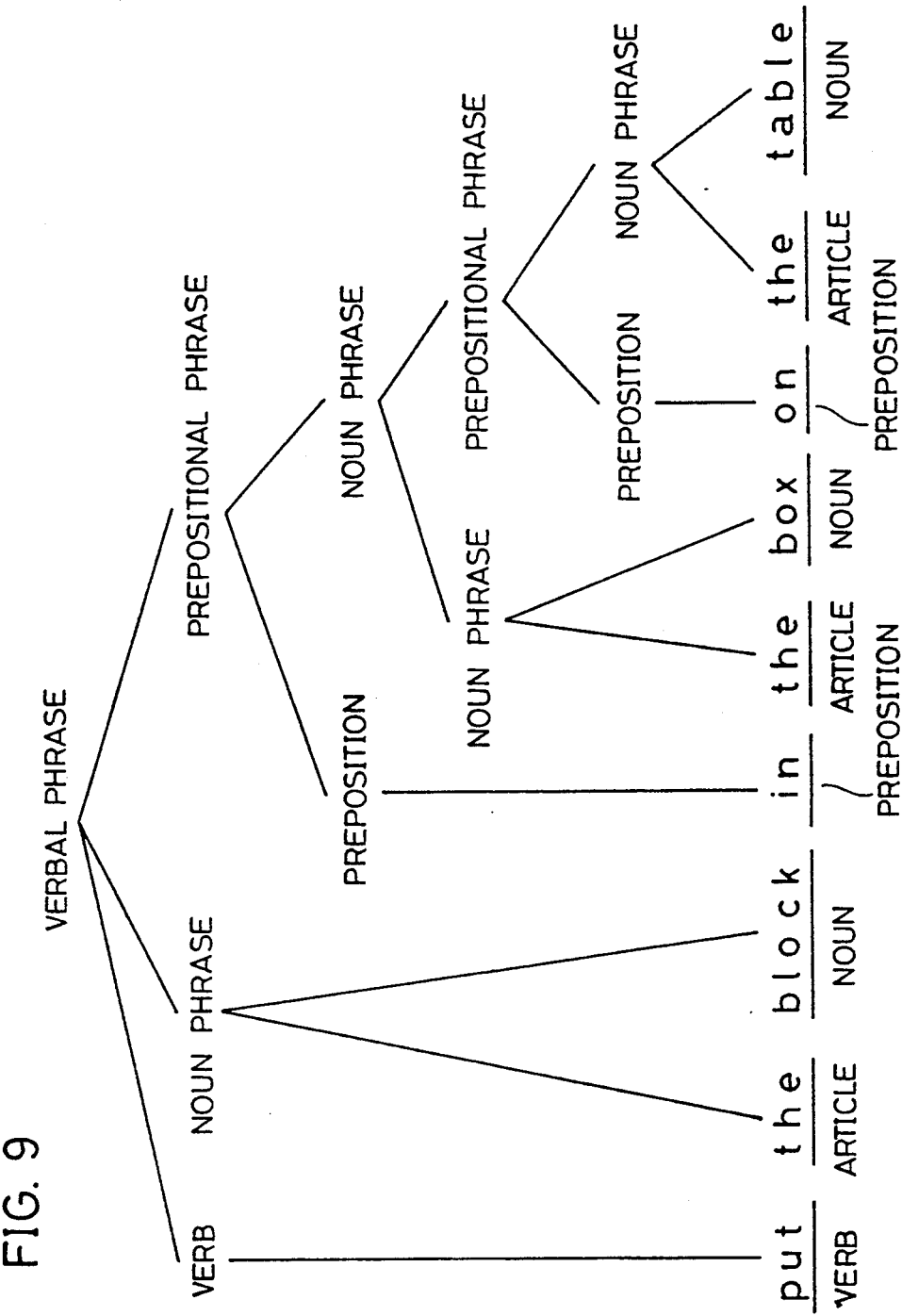
FIG. 9 is a representation schematically showing the structure of a subtree corresponding to a verbal phrase according to the second interpretation in FIG. 7.
Figure 10:
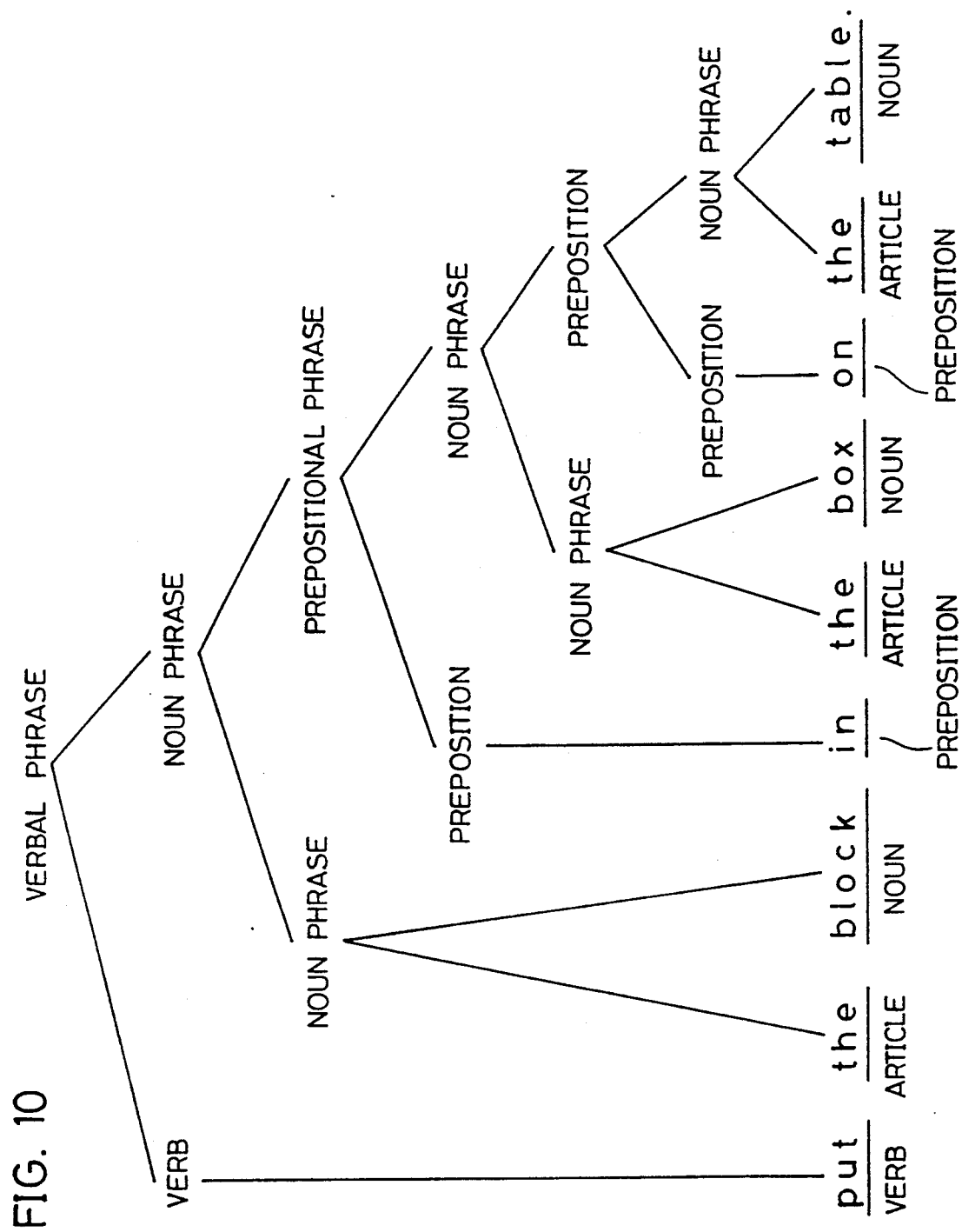
FIG. 10 is a representation schematically showing the structure of a subtree corresponding to the verbal phrase according to the third interpretation in FIG. 7.

Referring to FIG. 4, the information indicating the construction of subtree A stored in buffer A includes the four words "gave", "the", "cat", and "food" belonging to the subtree A and the part of speech of each word. The word string formed of these four words constitute a single verbal phrase with two interpretations. The first verb phrase (            ) "=the cat food is given"; the second verb phrase (            ) "=the cat is given food." As illustrated in FIG. 4 the interpretation depends upon which grammatical rule in Table 2 is applied from among rules (a) to (l). According to the first interpretation, the verbal phrase is formed of a "verb +noun phrase," and its subtree is as illustrated in FIG. 5. Meanwhile the second verbal phrase is formed of a "verb +noun phrase +noun phrase", and its subtree structure is as illustrated in FIG. 6. When interpretations 1 and 2 are compared, they are the same verbal phrase as a whole, but their internal structures are quite different. More specifically, this portion is an ambiguity closed portion.

Similarly, for the partial subtree B shown in FIG. 3, the construction as follows is stored in buffer 9. Referring to FIG. 7, information indicating the construction of subtree B includes nine words constituting the part "put . . . table" and the part of speech of each word. Information indicating the construction of the subtree stores three constructions possible for the subtree in parallel. These three interpretations 1-3 all represent a verbal phrase. The verbal phrase means "the block in the box is put on the table" according to the first interpretation, "the block is put in the box on the table" according to the second interpretation, and "the block in the box on the table is put" according to the third interpretation. Such difference in interpretation is generated depending upon in what order the grammatical rules set forth in Table 2 as described above are applied to the input text.

The three interpretations shown in FIG. 7 are obtained by applying the rules set forth in Table 2 to the input sentence in different orders. In all cases, the subtrees are still "verbal phrases", but their internal constructions are different. More specifically, the subtree B has a portion whose ambiguity is closed.

It is noted that not only the constructions of portions including ambiguity but also information on portions each having only one interpretation is also stored in buffer 9. For example, before the information set forth in FIG. 4, information on "I" is stored, and information on ", and" is stored. However, in the figures, they are not illustrated for the sake of simplification.

In the case of the present embodiment, transformation unit 13 transforms each of the six passing subtrees produced by combining the two interpretations set forth in FIG. 4 and three interpretations set forth in FIG. 7 into a parsing tree in the target from each of the six combinations. Translating sentence producing unit 14 produces a translated sentence for every parsing tree and stores the resultant sentence in buffer 9.

User interface module 8 operates as follows to select one desired sentence from the six different translated sentences stored in buffer, 9.

Assuming a translated sentence having the first interpretation set forth in FIG. 4 and the translated sentence translated according to the first interpretation shown in FIG. 7 is selected and displayed on CRT 3, the display contents would include the original sentence on the left side and the translated sentence according to the above-described interpretation on the right side as shown in FIG. 12. Such a display can readily be implemented using a conventional technique.

Figure 11:
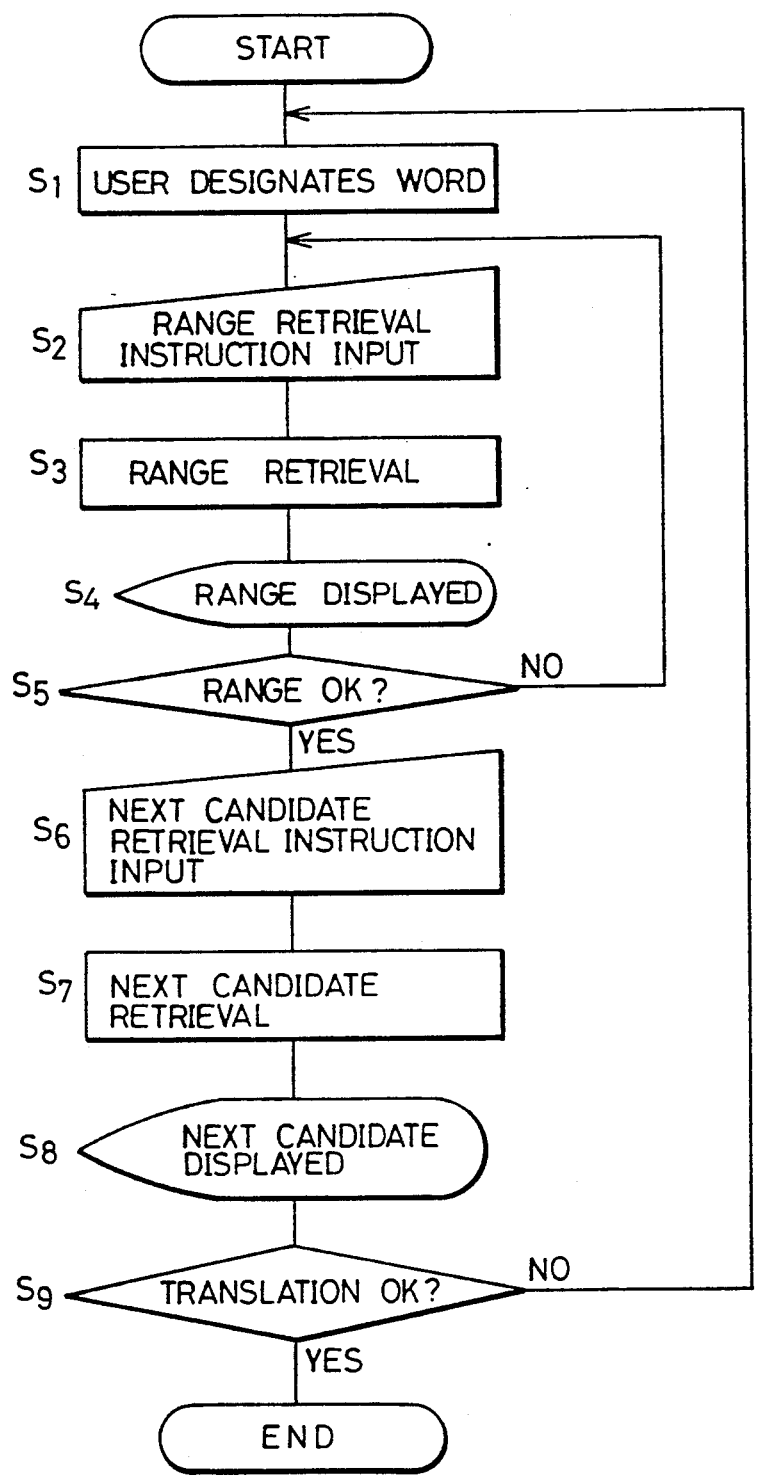
FIG. 11 is a flow chart for use in illustration of the operation of a user interface module.

Referring to FIG. 11, in step S1 in the operation of user interface module 8, the user designates one word included in the part which is considered by the user to be inappropriate in the displayed translated sentence. The designation is accomplished as follows, for example. If the user considers the translation the part of "gave the cat food" to be inappropriate, the user moves the cursor to an arbitrary word included in the part of the original sentence corresponding to the phrase "gave the cat food." In the example shown in FIG. 12, the cursor is moved to the word cat," and the word designated by the user is reversed for display.

In step S2 in FIG. 11, the user presses a prescribed key for range retrieval instruction input (not shown) disposed on the keyboard 4 (see FIG. 1).

Thereafter in step S3, the following range retrieval operation is conducted by user interface module 8. The range retrieval operation retrieves a subtree including a plurality of interpretations including ambiguous areas from subtrees including the word designated by the user.

Referring back to FIG. 4, the information shown in FIG. 4 is stored in buffer 9. If the operator designates the word "cat" the smallest subtree including the word with the ambiguous portion is retrieved from buffer 9 with the designated word as a starting point. In the case of the example shown in FIG. 4, the verbal phrase having two interpretations can be found as subtrees including the word "cat" and the remainder of the ambiguous portion. It is noted that the subtree to be retrieved may not necessarily include an ambiguity in interpretation nor the smallest one even if it includes an ambiguity. However, the limitation of using the smallest one including an interpretation ambiguity is preferably given in order to improve range designation.

Referring back to FIG. 13, it is determined that the range of the original sentence corresponding to the ambiguity subtree (subtree including interpretation ambiguity) is "gave the cat food" as shown in FIG. 4, and therefore the ranges of the original sentence and the translated sentence corresponding thereto are reversed for display. Such reversed display permits the user to easily know the ranges of the original sentence and translated sentence corresponding to the smallest ambiguity subtree among the subtrees including the word designated by the user.

Referring back to FIG. 11, the above-described range display (reversed) is performed in step S4.

Subsequently, in step S5, the operator determines whether or not the range displayed from the range display performed in step S4 coincides with the range intended by the operator. If it coincides with the intended range, the operator confirms the range by pressing a prescribed key, causing the processing proceed to step S6. If the displayed range does not agree with the intended range, the operator rejects the range by pressing another prescribed key on the keyboard. Thus, the processing returns to step S2. By once again inputting a range retrieval instruction in step S2, steps S3-S5 are repeated for displaying subtrees including the word designated by the operator and interpretation ambiguity from the smallest one in the ascending order. Each of these subtrees constitutes one constituent. Once one of the ranges corresponding to the subtrees displayed sequentially coincides with the one intended by the user, the interpretation in step S5 becomes YES and then control proceeds to step S6.

In the case of the example shown in FIG. 13, assuming the range displayed coincides with the range intended by the user, the processing proceeds to an input of a next candidate retrieval instruction in step S6. "Next candidate" indicates another interpretation for the part of the original sentence which is reversed for display. The reversed part is one constituent of the translated sentence. In step S6, the operator presses a next candidate retrieval instruction input key (not shown) on the keyboard, and then another interpretation in the range already designated in step S3 is retrieved in buffer 9. This processing is performed in step S7. More specifically, in step S7, the second interpretation of the two interpretations shown in FIG. 4 is retrieved as next candidate.

In step S8, the translation according to the second interpretation is displayed. The display is the one on the right side in FIG. 14.

If the entire translated sentence thus displayed coincides with the translated sentence desired by the operator, the result of the determination in step S9 is YES, thus completing the translating processing. Meanwhile, if the translated sentence in the range displayed in step S4 is the desired one and yet translation of another part is different from a desired one, the answer to the determination in step S9 becomes NO. As a result, the processing returns to step S1, the user newly designates a word included in a new part and the above-described processing will be repeated for the part including the word.

If " " is selected in FIG. 14 and the part after " " will be changed into another translation, referring to FIG. 15, the cursor is set to the position of "block" in step S1 in FIG. 11. The translated word " " corresponding to the word "block" is reversed for display in the translated sentence.

If the reversed portion does not coincide with the range desired by the user, a processing is performing for retrieving the smallest one of the ambiguity subtrees although larger than the previous subtree. The original sentence and translated sentence within the range corresponding to the new subtree will be reversed for display. If it coincides with the desired range, a processing for retrieving the next candidate for the range of the translated sentence will be performed.

Referring to FIG. 17, if the user presses the next candidate retrieval instruction input key in step S6 of FIG. 11, the translated sentence according to the second interpretation is displayed in place of the first interpretation shown in FIG. 7. If the translated sentence coincides with the one desired by the user, the translation ends at that point. Otherwise the next candidate retrieval instruction input key is pressed to display the third interpretation shown in FIG. 7. This operation is repeated to select a desired translated sentence in a desired range and then the translation process is completed.

As in the foregoing, according to the invention, subtrees including a word or a constituent in the original sentence defined by the operator are retrieved to permit the operator to select the desired portion for translation. A plurality of partial translated sentence candidates of a part corresponding to the subtree are generated using plurality of constructions for the subtree allowing the operator to select from a group of possible translations. Therefore, the range of ambiguity occurring in the parsing tree of an input sentence can be restricted on a subtree basis reducing the need for alternative translations of other sentence parts. Accordingly, the entire translated sentence may be readily translated by selecting an appropriate translation from among the plurality of interpretations of a selected subtree.

In an automatic translating machine according to the invention, subtrees which having a plurality of constructions are retrieved from the smallest to the largest in ascending order for allowing the operator to select one from the group. Since display and selection of a subtree is performed sequentially from the smallest to the largest, the interpretation of the subtree closest to a designated word and including an ambiguity can be confirmed more quickly so that the translation process can more efficiently be performed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic translating machine, comprising:
analyzing means for producing a plurality of parsing trees possible for a sentence in a prescribed first language;
means for producing translated sentences in a prescribed second language different from said first language, based on the parsing trees produced by said analyzing means in said first language;
manually operable means for designating an arbitrary first constituent in the sentence in said first language;
manually operable first selection means for selecting an arbitrary one of a plurality of second constituents of said sentence in the first language, each second constituent including said first constituent, said second constituent being analyzed into a plurality of parsing subtrees by said analyzing means, wherein each parsing subtree represents a different interpretation of said second constituent as a result of an ambiguity present in the translated sentences from the sentence in said first language; and
manually operable second selection means or selecting an arbitrary one of a plurality of constituents of a translated sentence in said second language produced by said producing means form the plurality of parsing subtrees corresponding to said selected second constituent.

2. An automatic translating machine as recited in claim 1, wherein said manually operable means for designating said first constituent includes manually operable means for designating an arbitrary word in said sentence in said first language.

3. An automatic translating machine as recited in claim 2, wherein said manually operable means for designating an arbitrary word includes,
means for displaying said sentence in said first language; and
manually operable pointing means for designating one arbitrary word in said sentence in said first language as displayed by said displaying means.

4. An automatic translating machine as recited in claim 3, wherein said manually operable first selection means includes,
means for storing a parsing tree;
means for retrieving parsing subtrees included in the parsing tree stored in said storage means including said designated word;

means for displaying the second constituent of said sentence in said first language belonging to each parsing subtree retrieved by said retrieving means separately from the other parts of said sentence in said first language; and means for inputting a signal indicating whether or not to select one of said retrieved parsing substrees corresponding to said displayed second constituent.

5. An automatic translating machine as recited in claim 4, wherein said means for retrieving said parsing subtrees includes means for retrieving only a subtree corresponding to a closed ambiguity part of said sentence in said first language.

6. An automatic translating machine as recited in claim 5, wherein said means for retrieving only the subtree corresponding to said closed ambiguity part includes means for retrieving only a subtree corresponding to the closed ambiguity part of said sentence in said first language in a prescribed order.

7. An automatic translating machine as recited in claim 6, wherein said means for retrieving the subtree in the prescribed order includes means for retrieving only a subtree corresponding to the closed ambiguity part of said sentence in said first language sequentially from the sentence part having the fewest words to the largest.

8. An automatic translating machine as recited in claim 4, wherein said means for retrieving parsing subtrees includes means for retrieving parsing subtrees of said sentence in said first language in a prescribed order.

9. An automatic translating machine as recited in claim 8, wherein said means for retrieving the parsing subtrees in the prescribed order includes means for retrieving parsing subtrees of said sentence in said first language sequentially from the sentence part having the fewest words to the largest.

10. An automatic translating machine as recited in claim 1, wherein said manually operable second selection means includes means for providing said producing means with a plurality of subtrees corresponding to said selected second constituent for displaying a plurality of translated sentences in said second language produced for each of said plurality of parsing subtrees by said producing means; and third selection means for selecting an arbitrary one of said displayed plurality of translated sentences in said second language.

11. An automatic translating machine as recited in claim 10, wherein said means for displaying the plurality kinds of constituents of the translated sentence in said second language includes means for displaying the plurality of translated sentences in the second language in a predetermined order.

12. An automatic translating machine as recited in claim 11, wherein said third selection means includes means for manually selecting the constituent of the translated sentence in said second language displayed by said means for displaying in the predetermined order.

* * * * *